Nov. 7, 1961 S. J. TETENBAUM ET AL 3,008,097
MICROWAVE SWITCH
Filed Aug. 25, 1958 2 Sheets-Sheet 1

FIG 1-A

INVENTORS
SIDNEY J. TETENBAUM
ROBERT M. HILL
ARTHUR L. ADEN
BY John F. Lawler
ATTORNEY INVENTORS
SIDNEY J. TETENBAUM
ROBERT M. HILL
ARTHUR L. ADEN
BY John F. Rawlee
ATTORNEY 3,008,097

MICROWAVE SWITCH

Sidney J. Tetenbaum, Los Altos, Robert M. Hill, Palo Alto, and Arthur L. Aden, Los Altos, Calif., assignors, by mesne assignments, to Sylvania Electric Products Inc., Wilmington, Del., a corporation of Delaware Filed Aug. 25, 1958, Ser. No. 756,751
6 Claims. (Cl. 333—7)

This invention relates to apparatus for the transmission and control of microwave energy, and more particularly to devices for selectively switching the flow of high power microwave energy in a branched transmission system.

High power microwave switching devices have a variety of microwave application such as, for example, in a radar system for connecting either of two or more microwave transmitters to a common antenna, or conversely, for connecting two or more antennas to a common transmitter. For these and other applications, it is highly desirable that the time of switching be controllable, that the switch be fast-acting, in the order of a few milliseconds or less, and that it be capable of handling high powers, with peaks from several hundred kilowatts to a few megawatts. Other desirable features of such a switch are that it be capable of operating over a fairly wide range of frequencies and that it have a relatively high isolation characteristic, in the order of 50 db or more.

In the past, controlled switching of microwave power has been accomplished by mechanical switches which are relatively slow in operation. Other types of microwave switches employ ferrite elements which have limited power handling capabilities because of temperature dependence. The isolation of ferrite switches is considerably smaller than that of either mechanical switches or of gas switches of the type to be described below. Gaseous discharge devices are particularly suitable for rapid switching of high powers, the best example of this being the well-known transmit-receive tube in which a microwave gas discharge acts as the switching element. However, in this type of switch, the discharge is solely responsive to the magnitude of electromagnetic energy which is to be switched and is not otherwise controllable. In other words, the time at which switching occurs coincides exclusively with transmission of electromagnetic energy above a certain intensity level.

It is therefore an object of the present invention to provide a high power microwave switching device which is capable of being switched on and off during the transmission of electromagnetic energy above a certain power level such as, for example, switching between pulses in pulsed transmission system.

Another object is to provide a switching device of this type which is capable of changing from a "switch off" to a "switch on" condition in a few milliseconds or less.

A further object is the provision of microwave switching apparatus which is capable of switching the connection of a single load to one of two or more microwave power sources which operate simultaneously.

Another object is the provision of a switch capable of handling peak powers from several hundred kilowatts to a few megawatts.

Still another object is a provision of a compact microwave switch having a relatively low insertion loss, in the order of 1 db.

A further object is the provision of a switching device which affords a high degree of isolation between components of the transmission system, in the order of 50 db or more.

A more specific object is the provision of a magnetically controlled resonance type gas discharge switch which is "opened" and "closed" by shifting the biasing magnetic field between a low or zero value and a value at or near cyclotron resonance intensity.

The foregoing objects, and others which will appear from the description to follow, are attained by the use of a principle involving the phenomenon of electron cyclotron resonance in the gas. This phenomenon is manifest when a suitable gas is subjected to a magnetic field of proper intensity and is excited by electromagnetic energy having a component of the oscillating electric field which is normal to the direction of the applied magnetic field. A sharp resonance in the breakdown power of the gas occurs when the static magnetic field B, is related to the angular frequency $\omega$, of the propagated electromagnetic waves by the expression $$B=(m/e)\omega=B_c$$

wherein $m$ and $e$ are the mass and charge of the electron, and $B_c$ designates the electron cyclotron resonant magnetic field. Under such conditions, electrons in the gas spiral about the flux lines of the static magnetic field with an orbital angular frequency equal to $\omega$, and between collisions with neutral gas atoms, can continuously absorb energy from the microwave electric field. The degree of such energy absorption is maximum when $B=B_c$. When B is not equal to $B_c$, the orbital motion of the electrons is out of phase with the microwave electric field, and the energy absorbed from the electric field is substantially reduced. In other words, when the condition of electron cyclotron resonance exists, there is a maximum transfer of energy from the microwaves to the electrons in the gas, and the breakdown power of the device is a minimum. Conversely, a high level of power is required for a breakdown of the gas when the value of the applied field B is sufficiently removed from cyclotron resonance.

In accordance with our invention, cyclotron resonant gas discharge switches may be used, for example, to connect two or more microwave transmitters, such as magnetrons, to a single antenna. Preferably there is a gas switch for each transmitter, and each switch has four terminal ports arranged in pairs on opposite sides of the switch. One port of one switch is connected to a port of the other so that the switches are arranged in tandem with the connected ports on adjacent or inner sides of the switches. In the two-transmitter two-switch embodiment, the transmitters are connected to respective ports on the outer sides of the switches and the antenna is connected to the inner port of one of the switches. The remainder of the switch ports are connected to matched or balanced power absorption loads. One of the features of this switching arrangement is that both transmitters may operate continuously, the power from the transmitter which is not connected to the antenna being dissipated in one of the matched loads.

Each of the two switching assemblies comprises a stacked pair of separate aligned containers or tubes of gas disposed between two 3-decibel 90 degree phase shift hybrid couplers of any type, for example, the short-slot top-wall coupler. A steady magnetic field is applied across each gas tube perpendicular to the E-vector of the propagated microwaves, the intensity of the field being adjusted to produce electron cyclotron resonance at the frequency of oscillation of the waves generated by the transmitters. The two-transmitter two-switch embodiment has two operating positions. In one state, a near cyclotron resonant field is applied to one gas switch while at the same time a zero or sufficiently small field is applied to the other gas switch. The incident microwave power causes the gas switch with the applied cyclotron resonant field to break down while leaving the other gas switch unfired thereby effectively connecting one transmitter ($T_2$) to the antenna while the other ($T_1$) is effectively connected to a high power matched load. In the other state, the magnetic fields applied to the gas switches are reversed, the fired and unfired gas switches are interchanged and transmitter $T_2$ is effectively connected to the antenna while transmitter $T_1$ is effectively connected to a high power load. Changing from one state to the other is accomplished by switching the energizing current, which may be a few amperes, from one electromagnet to the other. By this means it is possible to rapidly switch microwave energy at comparatively high power levels, for example, 200 kw. peak can be effectively switched in a few milliseconds.

Other features of the invention will become apparent, and the construction and operation of a preferred embodiment better understood from the following detailed description taken in connection with the accompanying drawings in which:

FIGURE 1 is a schematic or block diagram showing a transmission system comprising two microwave transmitters connected to a single antenna by a pair of interconnected gas discharge switch assemblies which embody our invention.

FIGURE 1-A is a diagram of an electronic switch forming part of the circuit of FIGURE 1.

Figure 1:
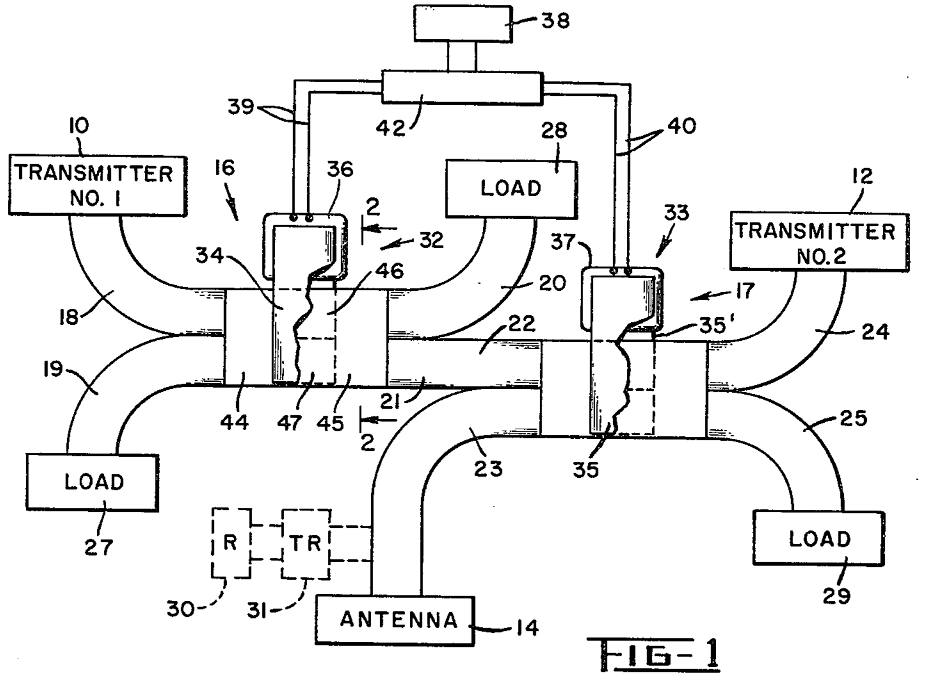

A microwave switching device constructed in accordance with this invention has utility in a radar system illustrated in block diagram in FIGURE 1 and comprising a first microwave generator or transmitter 10, a second transmitter 12 and a radiating antenna 14. Two switch assemblies 16 and 17, described in detail hereinafter, physically and electrically interconnect the antenna and the transmitters. Switch assembly 16 has four separate power input and output wave guide channels or ports 18, 19, 20 and 21, which are capable of transmitting electromagnetic waves, and switch assembly 17 similarly has ports 22, 23, 24 and 25. The switch assemblies are arranged in tandem with ports 21 and 22 joined together as shown so that microwave energy may propagate between the two switch assemblies without reflection. Ports 19 and 20 of assembly 17 connect to suitable matched power absorbers or loads 27 and 28, and assembly 17 has a similar load 29 connected to its port 25. Ports 18 and 24 of the respective switch assemblies are connected to respective transmitters 10 and 12, and antenna 14 similarly is connected to output port 23. While the present invention is concerned primarily with the transmission function of the radar system, there is also shown, by way of example, in broken line in FIGURE 1 a receiver 30 and a TR switch 31 connected ahead of the antenna for reception and detection of received signals. It will be understood, however, that a radar system is merely illustrative of one embodiment of the present invention which can be used with advantage in any microwave transmission system, including communication systems, where a high degree of isolation of and rapid switching between high power transmission sources are desired.

Control of the flow of microwave power to the antenna from one or the other of the two transmitters 10 and 12 while both are operating is accomplished by selectively causing gas breakdown in one of the switch assemblies 16 or 17 at a time, as will be more completely described below. These gases are subjected to the fields of magnets 32 and 33 which have poles 34, 34' and 35, 35' positioned relative to the wave guide so that the magnetic flux is perpendicular to the E-vector of electromagnetic waves. The magnets have coils 36 and 37, respectively, to which current is supplied from a suitable source 38 through lines 39 and 40, respectively, for producing the field of desired intensity across the switch tubes. In order to minimize the amount of current required to produce resonant fields, each magnet preferably is a permanent magnet having a fixed field, the strength of which is sufficiently less than the resonant value that breakdown of the gas by the incident power cannot occur unless the coil is energized.

An important feature of this invention is the rapidity with which high power levels of microwave energy can be switched or redirected within a transmission system, this limit being defined in part by the speed with which the static magnetic field can be switched between resonance and off-resonance values. An electronic switch 42 controls alternate energization of the magnet coils 36 and 37 and may take the form of a pair of triode amplifiers 66 and 67, see FIGURE 1-A, having their plates connected to one side of the current source 38, shown as a battery, the cathodes of the triodes being connected to the respective magnet coils 36 and 37. The return lines from coils 36 and 37 are connected together to the opposite side of battery 38. The control grids of triodes 66 and 67 are connected by lines 68 and 69 to a switch voltage source, not shown, which causes one tube at a time to conduct by raising and lowering the bias voltages on the tubes. This source, for example, may be a square wave generator having its output voltage applied directly to one control grid and through a voltage inverter to the other. One tube is biased above cut-off and conducts at the same time that the other is biased below cut-off and does not conduct. When the square wave reverses its polarity, the bias voltages on the tubes are interchanged and the microwave switching action takes place. The switching voltages applied to the grids of triodes 66 and 67 may be programmed or otherwise controlled for a desired sequence of operation of the microwave switching apparatus.

Figure 2:
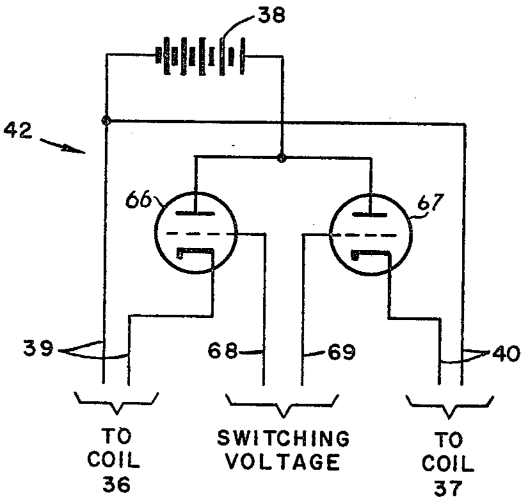
FIGURE 2 is a transverse section of one of the switches, taken on line 2—2 of FIGURE 1.
Figure 2:
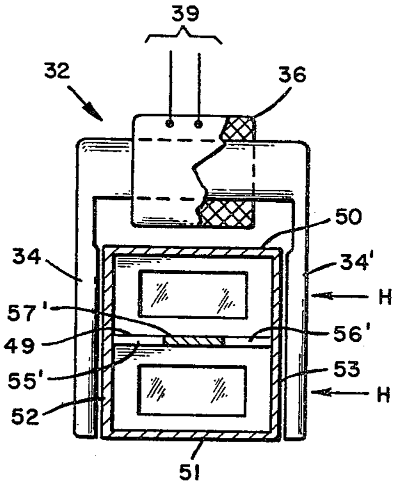
Figure 3:
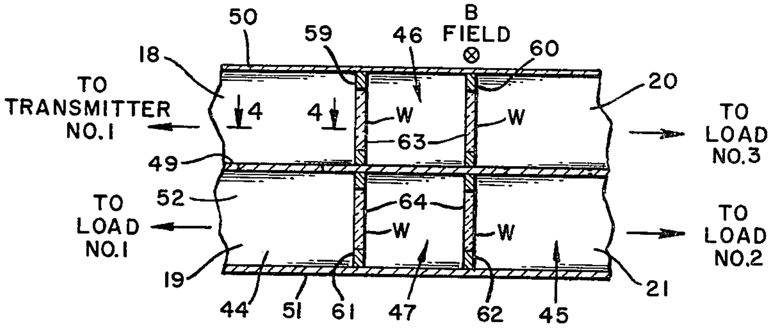
FIGURE 3 is an enlarged central longitudinal section of one of the switch assemblies, showing the hybrid couplers and the gas discharge tubes.
Figure 4:
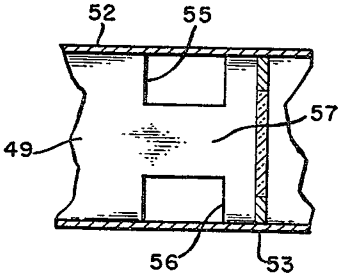
FIGURE 4 is a fragmentary sectional view showing the construction of one of the hybrid couplers, the section being taken on line 4—4 of FIGURE 3.

Switching assemblies 16 and 17 are substantially identical and therefore, only the structure of assembly 16 will be described here, like parts of the two assemblies being designated by like numbers and their primes. Assembly 16 comprises a pair of microwave directional couplers 44 and 45 connected on opposite sides of two separate, preferably vertically aligned gas discharge switch tubes 46 and 47. In the form of the invention illustrated in the drawings, the couplers and tubes are made from rectangular wave guides, there being essentially two such wave guides stacked on top of each other in the direction of the E-vector of electromagnetic waves transmitted through the guides, with a common middle wall 49, upper and lower broad walls 50 and 51, and side walls 52 and 53. Couplers 44 and 45 are designed to cause microwave power traveling in a given direction to divide equally at each coupler and continue in the same direction, the voltage which crosses over undergoing a 90 degree phase change. Any hybrid coupler which has these operating characteristics will suffice, and, by way of example, couplers 44 and 45 are shown as the short-slot top wall hybrid types described in an article entitled "The Short-Slot Hybrid Junction" by H. J. Riblet, Proceedings of the I.R.E., February 1952, pages 180–184, inclusive. The common or center wall of coupler 44 preferably is formed with two openings 55 and 56 defined by coupler side walls 52 and 53 and by central wall strip 57, see FIGURES 2 and 4. Coupler 45 is substantially identical to coupler 44, having openings 55' and 56' separated by center strip 57'. The design of these couplers is such that microwave power entering the coupler, for example through channel or port 18, divides equally between the two channels at the openings 55 and 56 and continues to propagate in the same direction in the two channels. The energy which crosses over from channel 18 to the adjacent channel 19, however, experiences a phase change such that the voltage which passes through the coupler openings leads the voltage that does not by 90° electrical degrees. If switch tubes 46 and 47 are not magnetically biased so that the gas therein will not break down in the presence of the incident microwave power, the energy passes substantially unattenuated through tubes 46 and 47 and further divides at openings 55′ and 56′ of coupler 45. The voltages in the upper channel of coupler 45 are advanced by 90 degrees during the cross-over to the lower channel, and since the voltages already in the lower channel had been advanced by 90 degrees at the first cross-over, the voltages are in phase coincidence and effectively combine or add together in the lower channel. However, any cross-over of voltages from the lower channel of coupler 45 to the upper channel results in destructive interference with the voltages in the upper channel because the voltages are 180 degrees out of phase. Therefore only a small amount of energy passes out terminal 20 to load 28 and substantially all of the power appears at terminal 21.

Assume that the tubes 46 and 47 are biased by a magnetic field of intensity sufficient to produce electron cyclotron resonance in the gas at the frequency of the microwave energy produced by transmitter 10. Retracing the flow of energy into coupler 44 through terminal 18, the power divides at the openings 55 and 56 as mentioned above. As soon as the power in both the upper and lower sections of coupler 45 reaches the cyclotron resonant gas in tubes 46 and 47, breakdown of the gas takes place and the resulting discharge places an effective short directly across the upper and lower channels at the inner end of the coupler. This causes reflection of the incident energy in both channels. The reflected voltage in the upper or transmitter connected channel, the phase of which voltage has not been changed, is substantially cancelled by the reflected voltage that crosses-over from the lower to the upper channel since the latter voltage has experienced two 90 degree phase advances as a result of crossing over twice. The power output of the transmitter recombines in the lower arm and passes through terminal 19 to absorption load 27.

Gas tubes 46 and 47 are substantially identical, and preferably comprise sections of rectangular wave guide, as shown, having longitudinally spaced transverse walls 59, 60 and 61, 62 respectively, sealed against the wave guide walls and defining gas chambers 63 and 64. Each transverse wall includes a broadband low-loss window $\omega$ made of suitable microwave permeable material. Microwave energy passes through the gas tubes without appreciable loss when the intensity of the applied magnetic field is not at the cyclotron resonance value. When it is, the gas breaks down and the resulting discharge across the window of the tube causes substantially all of the energy to be reflected. It is of interest to note that there is no change in phase of the microwave voltage when it is reflected in this manner. The direction of the applied static magnetic field, as shown by the arrangement of the electromagnets, is transversely of the direction of propagation and perpendicular to the electric field component of the waves, that is, the poles of each magnet are adjacent to narrow walls of the wave guide sections which comprise the gas tubes. Other arrangements of the electromagnets may be used, however, as long as the magnetic field is oriented perpendicularly to a significant component of the microwave electric field vector, the condition that is required to produce the cyclotron resonance phenomenon. As mentioned heretofore, each magnet preferably comprises a permanent magnet with a coil wound therearound to produce an additive magnetic field. The field of the permanent magnet has an intensity less than resonance value, the difference being equal to the magnitude of field developed by the electric coil when it is energized. The off-resonance fixed field permits the switch tubes to operate as though no field at all were applied to them, that is, the gas does not break down under the transmitted power but effectively transmits the energy through the tube as if it were a "closed" switch. Eddy current losses in the wave guide walls as a result of rapid switching of coil currents are minimized by using thin-walled gas tubes by constructing the tubes with low loss ceramic walls metallized to provide a conductive coating, or by other methods well-known in the art.

Figure 5:
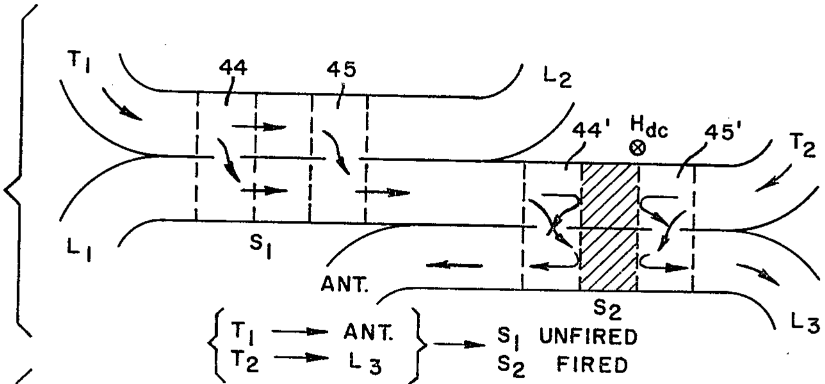
FIGURES 5 and 6 are diagrams with corresponding legends illustrating the switching action and showing the flow of microwave energy through the switch apparatus when one transmitter (FIGURE 5) and then the other (FIGURE 6) are connected to the antenna.
Figure 6:
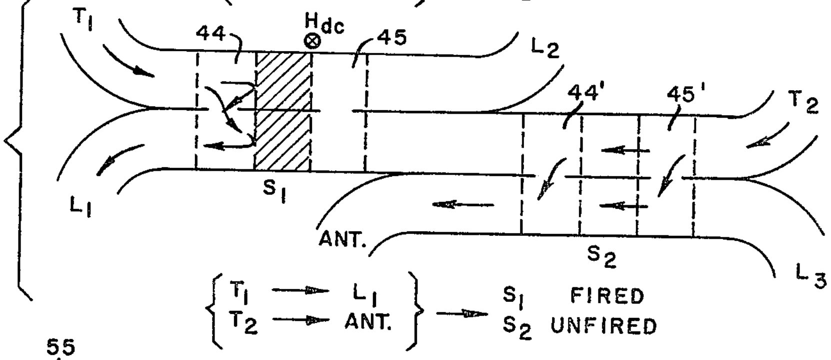

The operation of the switching apparatus will be understood by reference to the diagrams of FIGURES 5 and 6 wherein $T_1$ and $T_2$ represent transmitters 10 and 12, respectively, $L_1$, $L_2$ and $L_3$ designate loads 27, 28 and 29, respectively, and $S_1$ and $S_2$ indicate gas switches 16 and 17, respectively. $T_1$ and $T_2$ are operating simultaneously. FIGURE 5 illustrates the condition which prevails when transmitter $T_1$ is connected to the antenna, the output of transmitter $T_2$ being directed to load $L_3$. The magnetic field applied to $S_2$, indicated as $H_{dc}$, results from excitation of the magnet coil and causes the gas in both sections of $S_2$ to be in cyclotron resonance as represented by the cross-hatching.

Tracing the flow of energy from $T_1$ in FIGURE 5, the arrows indicate that the power divides at the first coupler with one-half passing into the lower channel and the other half continuing through the upper channel. The gas in both upper and lower parts of $S_1$, being biased by an off-resonance field, is unaffected by the microwave energy and the latter passes through $S_1$ as though it were "closed." On the opposite side of $S_1$, the right side as viewed in FIGURE 5, the energy in the upper channel combines with that in the lower channel and passes on toward $S_2$. It will be recalled from the previous discussion that these short-slot hybrid couplers direct the energy from one channel to the other in such a manner that only a negligible part remains in the input channel and therefore, in this instance, the energy dissipated in $L_2$ is a minimum.

The output from $S_1$ enters the upper section of the coupler 44′, divides substantially equally between the upper and lower channels, and continues toward switch tubes $S_2$. The gas in the latter, being biased by a resonant field $H_{dc}$, reacts with the incident power from $T_1$ and discharges across the tube windows facing $T_1$. This causes substantially total reflection of the energy in both the upper and lower channels as suggested by the arrows with the hairpin bends. The reflected energy in the upper channel divides at the slot of coupler 44′ and adds to the energy in the lower channel reflected by the lower tube of $S_2$, but the phase opposition of voltages in the upper channel prevents reflection of energy back to $S_1$. Substantially all of the power from $T_1$, then, passes to the antenna.

The output of the other transmitter $T_2$ enters coupler 45′, divides between the upper and lower channels, and is impressed on both tubes of $S_2$. Cyclotron resonance discharge at the near windows is caused by this incident power, as described above, and the reflected energy passes to $L_3$ with substantially none passing back toward $T_1$. Therefore $T_2$ is effectively isolated from the antenna as well as from the other transmitter.

When transmitter $T_2$ is to be connected to the antenna in place of $T_1$, control switch 42, see FIGURE 1–A, which controls the flow of energizing current to either of the magnets, is actuated so as to energize the magnet of $S_1$ and to de-energize that of $S_2$. The result is a change in the energy flow through the apparatus as shown in FIGURE 6. The output of $T_1$ is divided at coupler 44 and is reflected by the discharge in $S_1$ into $L_1$ in the same manner as the energy from $T_2$ was reflected by $S_2$ into $L_3$ in the previous example. The output of $T_2$, however, experiences no reflection because the antenna is connected to the diametrically opposite terminal of the same switch assembly. The energy from $T_2$ divides successively at couplers 45′ and 44′, as indicated by the arrows, and substantially all of it passes to the antenna with a minimum being transmitted toward $S_1$.

A typical high power microwave gas discharge switch which embodies this invention has the following performance and operating characteristics:

| | |
|---|---|
| Power switched: | |
| Peak ______kw__ | 100 |
| Average ______w__ | 100 |
| Pulse width ______μsec__ | 1 |
| Frequency ______kmc__ | 16.5 |
| High level VSWR ______ | <1.25:1 |
| High level insertion loss ______db__ | 0.6 |
| High level isolation ______db__ | >50 |
| Recovery time (3 db) ______milliseconds__ | 0.5 |
| Antenna bandwidth ______kmc__ | 15.5 to 17.5 |
| Transmitter 1 bandwidth ______kmc__ | 15.5 to 17.5 |
| Transmitter 2 bandwidth ______kmc__ | 15.5 to 17.5 |
| Switching time ______milliseconds__ | 2 |

From the foregoing, it will be seen we have provided a high power extremely rapid microwave gas discharge switch which is capable of being controlled in accordance with conditions external to the transmitter circuit. The high power capabilities of the gas discharge switch make it ideally suited for modern high power transmission systems. The high degree of isolation afforded by the switching apparatus insures protection of components in the system from damage such as burn-out. The switch according to this invention is inherently a broader band device as compared to conventional gas switches with field concentrating projections.

Although a preferred embodiment of the invention has been illustrated in the drawings and described in the foregoing specification, it will be understood that the invention is not limited to this specific apparatus since various modifications can be made to it by those who are skilled in the art without departing from the precepts of the invention. It is intended that the patent shall cover by suitable expression in the appended claims whatever features having patentable novelty reside in the invention.

What is claimed is:

1. In combination with two microwave transmitters and an antenna, microwave switching apparatus for alternately connecting each of said transmitters to the antenna, comprising first and second substantially identical switch assemblies, each assembly having a pair of ports at opposite ends thereof, means for connecting a port at one end of the first assembly with a port at one end of the second assembly, means for connecting the antenna to the other port at said one end of the second assembly, a port at the other end of the first assembly being connected to one of said transmitters, a port at the other end of the second assembly being connected to the other of said transmitters, matched loads connected to the remaining ports of the first and second assemblies; each switch assembly comprising a pair of microwave hybrid couplers and a container of ionizable gas between said couplers, each of said couplers comprising a pair of waveguides having a common wall with an opening through which microwave energy propagating in one direction through one of the waveguides passes into the other waveguide, and a magnet having poles on opposite sides of said container, means for energizing said magnet for producing a magnetic field of sufficient intensity to cause cyclotron resonance in the gas at the frequency of electromagnetic waves generated by said transmitters whereby the microwave energy causes an electron discharge in the gas which reflects the energy through the port adjacent to the port through which the energy entered the assembly; and means for alternately connecting said energizing means to the magnets of the two switch assemblies whereby said transmitters alternately are connected to said antenna.

2. In a microwave transmission system having three branches, microwave switching apparatus for alternately connecting one or the other of two of the branches with the third, said apparatus comprising first and second substantially identical switch assemblies, each assembly having four ports through which microwave energy is transmitted, two ports of each assembly being located at opposite ends of the assembly, said assemblies being arranged in tandem relation with one port at one end of the first assembly connected to a port at one end of the second assembly, said third branch being connected to the other port at said one end of the second assembly, a port at the other end of the first assembly being connected to one of said two branches and a port at the other end of the second assembly being connected to the other of said two branches, matched loads connected to the remaining ports of the first and second assemblies; each switch assembly comprising a pair of 3-decibel 90-degree phase shift microwave hybrid couplers and a container of ionizable gas between said couplers, each of said couplers comprising a pair of waveguides having a common wall with an opening through which microwave energy propagating in one direction through one of the waveguides divides and passes into the other waveguide, and a magnet having poles on opposite sides of said container, means for energizing said magnet for producing a magnetic field of sufficient intensity to cause cyclotron resonance in the gas at the frequency of electromagnetic waves propagated in said transmission system whereby incident energy causes a discharge in the gas which blocks flow of energy therethrough and reflects the energy through the port adjacent to the port through which the energy entered the assembly; and means for alternately connecting said energizing means to the magnets of the two assemblies whereby said first two branches alternately are connected to the third branch.

3. Microwave switching apparatus for alternately connecting the first of two microwave transmission branches to a third branch and simultaneously isolating the second branch from the first and third, comprising first and second switch assemblies, each assembly having four terminal ports arranged in pairs at opposite ends, one port at one end of the first assembly being connected with a port at one end of the second assembly, the third microwave branch being connected to the other port at said one end of the second assembly, means for connecting a port at the other end of the first assembly to one of said two branches, means for connecting a port at the other end of the second assembly to the other of said microwave branches; each switch assembly comprising a pair of 3-decibel 90-degree phase shift hybrid couplers, gas tube means interconnecting said couplers, means for producing a magnetic field through said gas of proper direction and of sufficient intensity to cause cyclotron resonance in the gas at the frequency of electromagnetic wave propagated through said branches whereby incident energy produces a discharge in said gas and blocks the flow of energy through the assembly, and means for alternately energizing and de-energizing the respective field producing means for the two switch assemblies whereby said first two branches alternately are connected to the third branch.

4. Microwave switching apparatus for alternately connecting one of two transmitters to an antenna, comprising first and second substantially identical switch assemblies connected in series with their adjacent ends connected together and with their remote ends respectively connected to the transmitters, the antenna being connected to said adjacent end of the second assembly, each switch assembly comprising a pair of hybrid couplers, each coupler having two terminal ports, a container of ionizable gas between said couplers, and a magnet having poles on opposite sides of said container, means for energizing said magnets for producing a magnetic field through said gas of sufficient intensity to cause cyclotron resonance in the gas at the frequency of the electromagnetic energy generated by either of said transmitters whereby incident microwave energy causes an electron discharge in said gas and blocks the transmission of energy through the assembly; and means for alternately connecting said energizing means to the magnets of the two assemblies whereby said transmitters are alternately connected to said antenna.

5. A microwave transmission system comprising three waveguides and switching apparatus adapted electrically to connect either the first or second of said two guides to the third, said apparatus comprising first and second switch assemblies connected in series between the first and second guides for the transmission of electromagnetic waves, the third guide being connected to one of the two assemblies, each assembly comprising a pair of rectangular waveguide sections having two ports at each end and having a common intermediate broad wall, tube means containing ionizable gas disposed within said sections in the path of transmission of microwave energy through the sections, a portion of said common wall on each side of said tube means being slotted to form a hybrid microwave coupler, means to produce in said gas a magnetic field of intensity sufficient to cause electrons in the gas to be in cyclotron resonance at a predetermined frequency whereby incident energy causes a discharge in the gas which reflects the energy through the port adjacent to the port through which the energy entered the assembly, means for connecting a port at one end of the first assembly to a port at one end of the second assembly, means for connecting said first and second waveguides to ports, respectively, at the other ends of the switch assemblies, means for connecting the third waveguide to the other port at one end of the second assembly, and control means for selectively energizing the field producing means of the first and second switch assemblies one at a time.

6. A microwave transmission system comprising three waveguides and switching apparatus adapted electrically to connect either of two of said guides to the third, said apparatus comprising first and second switch assemblies connected in series between said two waveguides, the third waveguide being connected to the second assembly at the end thereof opposite from the connection to one of said two waveguides, each assembly comprising a pair of rectangular waveguide sections having a common broad wall, tubes containing ionizable gas disposed in adjacent portions of said sections, each tube having a pair of axially spaced transverse microwave permeable windows sealed to the walls of the section, portions of said common wall at opposite ends of said tubes being slotted to form two 3-decibel hybrid microwave couplers, means to produce a magnetic field in said gas of intensity sufficient to cause electrons in said gas to be in cyclotron resonance at a predetermined frequency, and control means for selectively energizing the field producing means of the first and second switch assemblies one at a time.

References Cited in the file of this patent

UNITED STATES PATENTS

| | | |
|---|---|---|
| 2,586,993 | Riblet | Feb. 26, 1952 |
| 2,602,908 | Linder | July 8, 1952 |
| 2,869,081 | Teeter | Jan. 13, 1959 |